United States Patent
Jasny

[15] 3,678,272
[45] July 18, 1972

[54] SPECTROPHOSPHORIMETER

[72] Inventor: Jan Jasny, Baleya, Poland

[73] Assignee: Polska Akademia Nauk Instytut Chemii Fizycznej, Warszawa, Poland

[22] Filed: March 18, 1971

[21] Appl. No.: 125,525

[52] U.S. Cl. .................................................. 250/71 R
[51] Int. Cl. ................................................... G01j 3/42
[58] Field of Search .................... 250/71 R, 71 G, 43.5 FC

[56] References Cited

UNITED STATES PATENTS

| | | | |
|---|---|---|---|
| 2,987,620 | 6/1961 | Lewis et al. | 250/71 G |
| 3,619,061 | 11/1971 | Mitchell | 250/71 R |

Primary Examiner—James W. Lawrence
Assistant Examiner—Davis L. Willis
Attorney—Waters, Roditi, Schwartz & Nissen

[57] ABSTRACT

A spectrophosphorimeter is disclosed for defining the spectrum and the dephosphorescence function of solids and liquids wherein the matter to be tested is subjected to a zonal excitation and analysis. The spectrophosphorimeter comprises a prismatic or mirror system by which a transverse translation is obtained between the beam of excitation and the beam of received radiation to define an interval between the time of excitation and the time of analysis. The prismatic or mirror system is rotatable so that the beams travel along a circular path, the angular interval between the beams being regulated by adjusting the relative angular positions of the excitation system and the analyzing system with respect to the axis of rotation of the prismatic or mirror system.

10 Claims, 5 Drawing Figures

PATENTED JUL 18 1972 3,678,272

3,678,272

SPECTROPHOSPHORIMETER

BRIEF SUMMARY OF THE INVENTION

The present invention relates to spectrophosphorimeters, i.e. instruments for defining the spectra and the dephosphorescence function of solids and fluids. By means of a mirror or prismatic system of the instrument, a transverse translation of the beam of excitation radiation and of the beam of received phosphorescence radiation is obtained, by subjecting the tested matter to zonal excitation and analysis, whereat the time elapsing from the moment of excitation to the moment of analysis of spectral phosphorescence depends on the speed of said translation and on the distance between both beams.

Known are spectrophosphorimeters in which a suitable system of movable diaphragms or optical elements opens and shuts the path of the excitation beam and the path of the received beam in succession so that the matter tested is first subjected to excitation and then to spectral analysis. The disadvantage of this arrangement is that it is impossible to define the dephosphorescence function by means of such an instrument, and the application of the instrument is confined to determination of the mean time of dephosphorescence assuming the function of dephosphorescence to be of an exponential character. Moreover, no utilization can be made in such instruments of the energy of the excitation radiation beam and of the phosphorescence radiation beam, because of the necessity of periodic blocking of these beams.

Also known are spectrophosphorimeters by which an exact definition of the dephosphorescence function of solids is possible. In such instruments the matter tested is placed in the perimeter of a spinning drum and it moves in relation to a fixed excitation system and a fixed analyzing system, whereat the time elapsing from the moment of excitation to the moment of analysis depends on the peripheral speed of the drum and on the distance between the excitation and the analyzing system. The disadvantage of these instruments is the time consuming preparation of the sample and its unfitness for testing of the phosphorescence of liquids.

The above mentioned drawbacks are obviated by the instrument according to the present invention which permits an exact definition of the spectrum and the dephosphorescence function of solids and liquids placed, for example, in a cell having a transparent bottom. The instrument turns fully to use the energy of the beams of excitation radiation and the beams of phosphorescence radiation.

DETAILED DESCRIPTION

Figure 1:
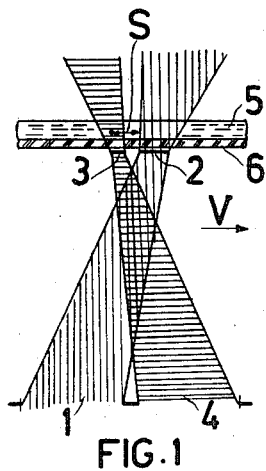
FIG. 1 illustrates schematically the ray path beneath and inside a cell containing the matter being tested.

In the drawing is shown a transparent bottom 6 of a cell holding the tested matter 5. An image 2 of a source of excitation radiation, and a zone 3 reproduced at the exit slot of a monochromator are directly beneath the bottom 6 of the cell.

FIG. 1 also shows the exit pupil 1 of the excitation system, said pupil vertically restricting the shaded beam of excitation radiation, and the entrance pupil 4 of the monochromator, the latter pupil vertically restricting the shaded beam of the received phosphorescence radiation. Vector V represents the direction and speed of the beams, while dimension S represents the distance between the extremity of the excitation beam and the middle of the received beam.

Figure 2:
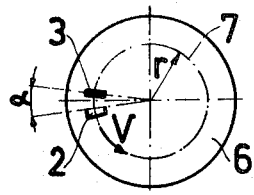
FIG. 2 is a bottom plan view of the cell in the direction Y in FIG. 3.

FIG. 2 illustrates a correlative location of image 2 and of the zone 3 when these are describing a circle 7 at a radium r. The extremity of image 2 and the axis of symmetry of zone 3 here form an angle $\alpha$. Vector V represents the direction of rotational movement and the peripheral speed of image 2 and zone 3.

Figure 3:
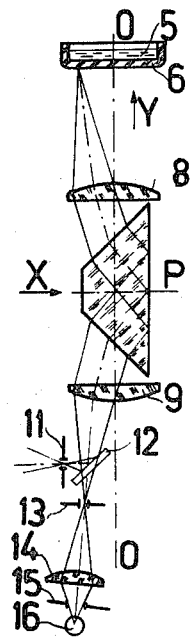
FIG. 3 is a vertical section of an optical system with a rotatable inverting prism.
Figure 4:
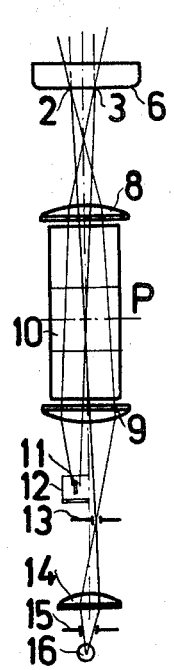
FIG. 4 is a view of the system of FIG. 3 in the direction X in FIG. 3.

The optical system presented in FIGS. 3 and 4 includes a focusing system comprising lenses 8 and 9, a spinning inverting prism 10 of the Dove-Amici type, a monochromator having an entrance slot 11 situated behind a flat mirror 12, and an excitation system comprising fled type diaphragm 13, lens 14, aperture type diaphragm 15, and radiation source 16.

The instrument operates as follows.

The beam of excitation radiation penetrates inside the tested matter 5 through the transparent bottom 6 of the cell, said beam moving at a defined speed in the direction V in FIG. 1. Following the excitation beam at the same speed, is the beam which is received by the monochromator. In this manner first the excitation radiation is projected on each of all the elements of the matter tested and then, after passage of defined time, the phosphorescent radiation emitted by each of these elements is analyzed. The mean time $t$ elapsing from the moment of interrupting the excitation radiation to the moment of analysis depends on the distance $S$ and speed $V$ of both beams. This time is calculated from the formula: $t = S\ V$.

Both beams must be entirely separated inside the tested matter 5 and in the bottom 6 of the cell even if there is a minimum distance $S$, since otherwise the monochromator would receive a dispersed or partially reflected excitation radiation. Suitable separation of the beams can be obtained, for instance, by location of the exit pupil 1 of the excitation system of the entrance pupil 4 of the monochromator such a that the beams can cross each other in the space beneath the bottom 6 of the cell. The minimum distance $S$ cannot be less than half the width of zone 3; it is preferred that the minimum value of $S$ be taken as equal to the width of zone 3. At a minimum distance $S$, pupils 1 and 4 ought to be entirely separated. At larger distances $S$, the pupils may be partially or fully superimposed on one another provided that the primary inclination of both beams is maintained.

The dephosphorescence function can be defined either by increasing the distance $S$ at constant speed $V$, or by decreasing speed $V$ at constant distance $S$. The accuracy of the dephosphorescence function definition is determined by the so called time resolution, which in the case of the present invention, is equal to the time at which the beams move over the equivalent section of one half of the width of zone 3.

The phosphorescence spectrum can be defined for all the values of $S$ and $V$, by gradually changing the wave length of the light transmitted through the monochromator.

In the systems presented for exemplification in FIGS. 2–5, the beams do not follow a straight path but describe a circular path and therefore the image 2 and zone 3 move along the path 7 at peripheral speed $V$. This speed depends upon the radius $r$ and the frequency of circulation, i.e. upon the number of circulations per unit of time. In the systems presented in FIGS. 3–5 the frequency of circulations of the image 2 and of the zone 3 is twice as high as the frequency of revolutions of either the spinning prism 10 or mirror 20. The mean time $t$ of the analysis is circulated from the formula:

$$t = \alpha/4\pi n;$$

where the angle $\alpha$ is expressed in radians, and the frequency of revolutions $n$ is the number of revolutions made by prism 10 or mirror 20 per unit of time.

The dephosphorescence function is defined by increasing, for example, the angle $\alpha$ at a constant frequency of revolutions $n$. Assuming that a minimum angle $\alpha$ corresponds to the section of path 7 equal to the width $d$, of zone 3, and that a maximum angle $\alpha$ is equal to three quarters of a full angle, the variation of angle $\alpha$ is obtained within:

$$(d/r) \leq \alpha \leq 1.5$$

and the variation of analysis mean time $t$ is expressed as follows:

$$(d/4 \pi nr) \leq t \leq (1.5/4 n)$$

time resolution is defined by the formula:

$$t = (d/8 \pi nr)$$

For instance for values $d = 0.25$ mm; $r = 10$ mm; and $n = 50$ rev/sec. the time variation $t$ is obtained within $4 \cdot 10^{-5}$ sec. to $750 \cdot 10^{-5}$ sec. at the time resolution $t = 2 \cdot 10^{-5}$ sec. A different range of time variation $t$ is obtainable for the same instrument by applying a different frequency of revolution $n$ of the spinning prism 10 or mirror 20.

In the instrument whose optical system is presented for exemplification in FIGS. 3 and 4, source 16 sends a beam of excitation rays towards the lens 14. The aperture of this beam is restricted by diaphragm 15. Lens 14 focuses the beam in the field diaphragm 13 which sharply restricts the image produced thereat of the radiation source. Lenses 8 and 9 of the focusing system produce a repeated image 2 of radiation sources 16 beneath the bottom 6 of the cell holding the tested matter 5. On its travel through the focusing system, the beam passes through the inverting prism 10. The system is constructed such that inside the prism 10 the beam is parallel, and that the image of the aperture diaphragm 15 is formed in the plane P of symmetry of this prism, said image being the exit pupil of the excitation system. The same focusing system, comprising lenses 8 and 9, produces the image of zone 3 in the entrance slot 11 of the monochromator, said slot being situated behind the mirror 12. From zone 3 to the slot 11 travels the beam of phosphorescence radiation emitted by tested matter 5. This beam is restricted by the aperture diaphragm of the monochromator, said diaphragm being usually situated near the dispersion element. If the field lens reproducing plane P in the plane of the monochromator aperture diaphragm is close to slot 11, then the entrance pupil of the monochromator is situated in plane P. If the distance between the image 2 and zone 3 is small, the entrance pupil of the monochromator and the exit pupil of the illuminating system are confined close to each other. This distance can be altered as desired by turning about the axis 0—0 the whole excitation system comprised of elements 13, 14, 15 and 16. The angle $\alpha$ confined between image 2 and zone 3 will thus be increased. The appropriate peripheral speed V of the image 2 and of the zone 3 is obtained by revolving the prism 10 about the axis 0—0 at a suitable frequency of revolution.

Figure 5:
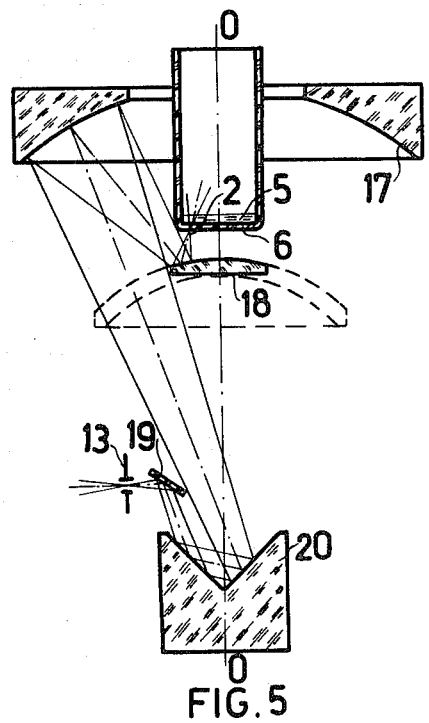
FIG. 5 is a vertical section of the optical system with a spinning mirror of a roof-section.

In FIG. 5 the optical system of the instrument exclusively comprises elements which are of the mirror type. The characteristic feature of such a system is its transmission of radiation in a wide range of wave lengths, the absence of harmful dispersion radiation and of chromatic aberration, i.e. the defects in optical reproduction caused by dispersion in optical elements. By proper selection of rays of a concave surface of mirror 17 and of a convex surface of mirror 18, the spherical aberration of the focusing system can be remarkably reduced. Such an aberration is a defect in optical reproduction caused by spherical surfaces of the optical elements. Due to only small aberrations which are present, the beam apertures can be large and therefore, the energy of the excitation radiation and of the received phosphorescence radiation can be large. The beam of excitation radiation leaving field diaphragm 15 is first reflected by mirror 19, then twice by roof-section mirror 20, and then is projected on the concave mirror 17. After being reflected by mirrors 17 and 18 the beam is focused beneath the bottom 6 of the cell, producing thereat the image 2 of the excitation radiation source. In the plane turned about the axis 0—0 by the angle $\alpha$ in relation to the plane of the represented image, an exactly like beam of phosphorescence radiation passes through the system in the opposite direction, focusing in the entrance slot of the monochromator. There is a flat mirror placed in front of the slot which is similar to mirror 19. The angle $\alpha$ can be altered by turning the excitation system together with mirror 19 about the axis 0—0. The exit pupil of the excitation system and the entrance pupil of the monochromator are located near the mirror 18 and revolve around this mirror at a frequency twice as high as that of the roof-section mirror 20 revolving about the axis 0—0. The convex mirror 18 can also be made in the shape of a focusless meniscus, represented in FIG. 5 by dotted lines, whose middle part is covered with a reflecting layer. Such a meniscus can play the role of an external window in a Dewar type cell which usually encloses the cells holding cooled substances.

What is claimed is:

1. A spectrophosphorimeter apparatus for defining the spectrum and the dephosphorescence function of solids and fluids, said apparatus comprising means to hold the matter to be tested, excitation means for subjecting the matter to be tested to a excitation radiation extending over a zone of said matter, analyzing means for analyzing a beam of phosphorescence radiation produced by said matter upon irradiation thereof by said beam of excitation radiation, and optical means positioned to transmit the beam of excitation radiation from the excitation means to said matter being tested and to transmit the beam of phosphorescence radiation produced by said matter to said analyzing means, said optical means including a displaceable element to produce a transverse translation of the beam of excitation radiation and of the beam of received phosphorescence radiation, such that the time elapsing from the time of excitation to the time of analysis is a function of the speed of said translation and the distance between said beams.

2. Apparatus as claimed in claim 1 wherein said displaceable element comprises a mirror system.

3. Apparatus as claimed in claim 1 wherein said displaceable element comprises a system of prisms.

4. Apparatus as claimed in claim 1 wherein said displaceable element is rotatable about an axis and said beams travel along a circular translation path at the same speed and at a predetermined angular interval.

5. Apparatus as claimed in claim 4 comprises means for varying the relative positions of said excitation means and said analyzing means with respect to said axis to vary said angular interval.

6. Apparatus as claimed in claim 5 wherein said beam of phosphorescence radiation extends over a zone of said matter being tested, and the distance between the center of the latter said zone and the closest edge of the zone of the beam of excitation is equal to the width of said zone over which the beam of phosphorescence radiation extends.

7. Apparatus as claimed in claim 5 wherein said beam of excitation and beam of phosphorescence radiation intersect at a location spaced from the matter being tested.

8. Apparatus as claimed in claim 7 wherein said optical means comprises a focusing system for said beams.

9. Apparatus as claimed in claim 8 wherein said analyzing means comprises a monochromator.

10. Apparatus as claimed in claim 8 wherein said means to hold the matter being tested comprises a vessel having a transparent portion through which said beams travel.

* * * * *